Patented June 6, 1939

2,161,622

UNITED STATES PATENT OFFICE 2,161,622

WATER-INSOLUBLE AZO DYESTUFFS

Josef Haller, Leverkusen-I. G. Werk, Germany, assignor to General Aniline Works, Inc., New York, N. Y., a corporation of Delaware No Drawing. Application November 26, 1937, Serial No. 176,633. In Germany December 2, 1936

8 Claims. (Cl. 260—152)

The present invention relates to new water-insoluble azodyestuffs and to fibers dyed therewith; more particularly it relates to waterinsoluble azodyestuffs, which may be represented by the following formula:

$$A-(N=N-B)_n$$

In this formula A stands for a triphendioxazine radical, B stands for the radical of an ice color coupling component, and $n$ for one of the numbers 1 to 4, and the —N=N—B groups are attached to the m-positions with respect to the azine nitrogen atoms.

My new dyestuffs are obtained by diazotizing triphendioxazines which contain in m-position to the azine nitrogen one or more amino groups and coupling with azo components, the compounds being selected in such a manner that the resulting dyestuffs are free from watersolubilizing groups.

Up to the present time diazotized triphendioxazines which contain in the dyestuff molecule one or more amino groups have not been used for the manufacture of azodyestuffs. In fact, not all amino-triphendioxazines can be transformed into their diazo compounds; for instance, in the case in which the amino groups stand in p-position to the azine-nitrogen atoms, the nitrous acid has only an oxidizing effect and, with rearrangement of the quinoid linkages, there is obtained a compound which by reduction can be converted into the original amine. Probably this oxidation process proceeds as follows:

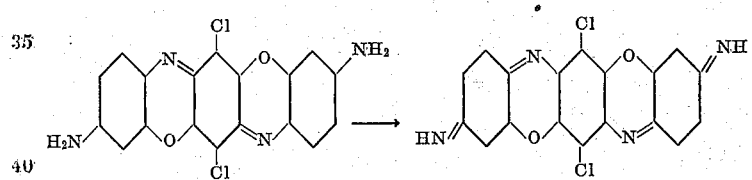

In contradistinction thereto diazotization can easily be effected if the amino group or groups in question stand in m-position to the azine-nitrogen. If the positions in the triphendioxazine are numbered as follows:

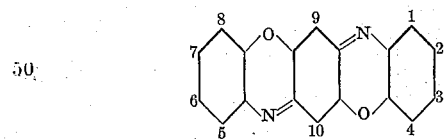

the positions 2, 4, 6 and 8 are capable of bearing diazotizable amino groups.

The diazo and polydiazo compounds of these amines dissolve in water in form of their salts, with yellow to orange-red coloration. On coupling on the fiber with ice color coupling components they yield blue, brown and black shades of very good fastness properties.

The technical value of the new dyestuffs is to be primarily recognized in the excellent fastness to light of numerous combinations and in their remarkable strength of color. As suitable ice color coupling components there may be mentioned by way of example the arylides of o-hydroxycarboxylic acids of the naphthalene series or other cyclic compounds, and the arylides of acetoacetic acid and the derivatives thereof.

It is surprising that when coupling tetrazotized diaminodioxazines, which moreover contain alkoxy groups in o-position to the diazotized amino groups, with acetoacetic arylides, which are typical yellow components, deep black shades are produced.

Triphendioxazines containing amino groups, used in the present invention as diazo components, can be obtained according to known processes (cf. e. g., U. S. P. 2,092,387, 2,024,525 and 2,020,651). Besides the amino groups they may contain in the molecule other substituents as, for instance, halogen, alkyl, alkoxy, except watersolubilizing groups, such as the sulfonic acid and the carboxylic acid group.

The following examples illustrate the invention without being restricted thereto.

EXAMPLE 1

50 g. of cotton yarn are grounded at 30° C. in a selection which contains per liter 6 g. of 2.3-hydroxynaphthoic acid anilide. The yarn is squeezed off and introduced into a tetrazo solution which has been neutralized with sodium acetate and containing per liter the tetrazo compound from 1.95 g. of 4.8-diamino-9.10-dichlorotriphendioxazine. After developing is complete, the product is rinsed and soaped in a boiling bath.

A bluish-black is obtained of good fastness properties.

The dyestuff corresponds to the following formula:

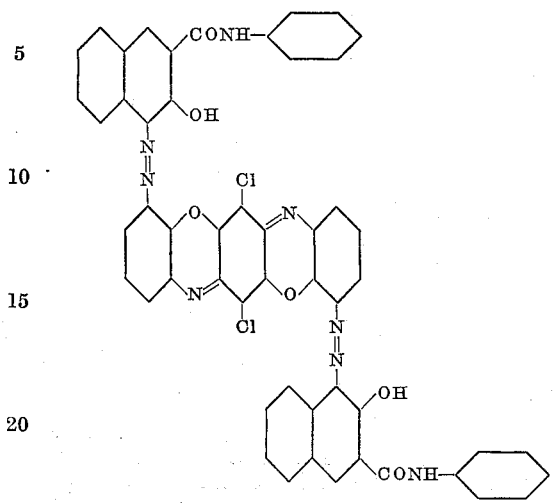

EXAMPLE 2

Cotton yarn is grounded in a solution which contains 1.5 g. of 2.3-hydroxynaphthoyl-β-naphthylamine per liter. After squeezing off, the material is developed in a tetrazo solution, neutralized with sodium acetate, and which contains per liter the tetrazo compound from 2.35 g. of 2.6-diamino-3.7-diethoxy-9.10-dichlorotriphendioxazine. The deep black dyeing thus prepared is distinguished by an excellent fastness to light.

The dyestuff corresponds to the following formula:

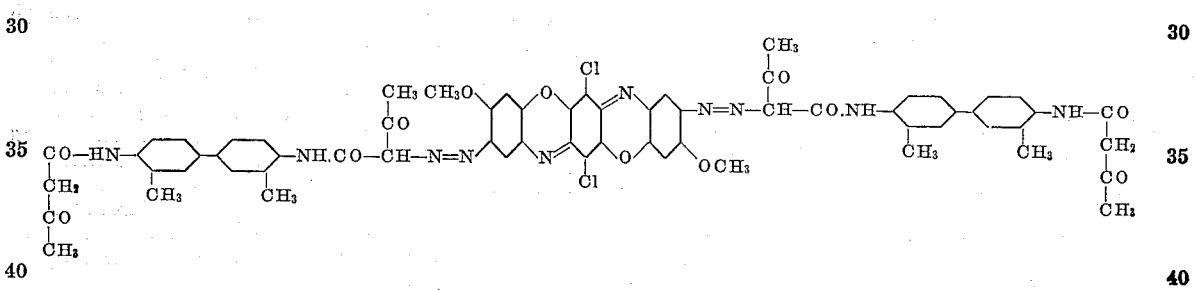

On substituting the 2.3-hydroxynaphthoyl-β-naphthylamine by 3 g. of diacetoacetyl-o-tolidine, there is obtained a bluish black.

EXAMPLE 3

*Slop-padding solution*

10 g. of diacetoacetic-o-tolidide are dissolved with 10 ccs. of sulfonated castor oil and
15 ccs. of caustic soda lye of 39° Bé. with the addition of water, and the whole is made up with water to one liter.

*Printing paste*

15 g. of 2.6-diamino-3.7-dimethoxy-9.10-dichlorotriphenodioxazine are tetrazotized in
200 ccs. of ice water with the addition of
50 ccs. of sulfuric acid (20%) and
5.5 g. of sodium nitrite. After some time there are added
6.5 g. of crystallized sodium acetate and the orange colored solution is stirred into
500 g. of a wheat starch-tragacanth thickener.

Bleached cotton tissue is treated with the above slop-padding solution on the foulard and dried; then the printing paste is printed thereupon, and, after drying, the excess boiling bath, which contains per liter 5 ccs. of caustic soda soaped in a boiling bath.

A deep black is thus obtained.

The dyestuff obtained has the following probable formula:

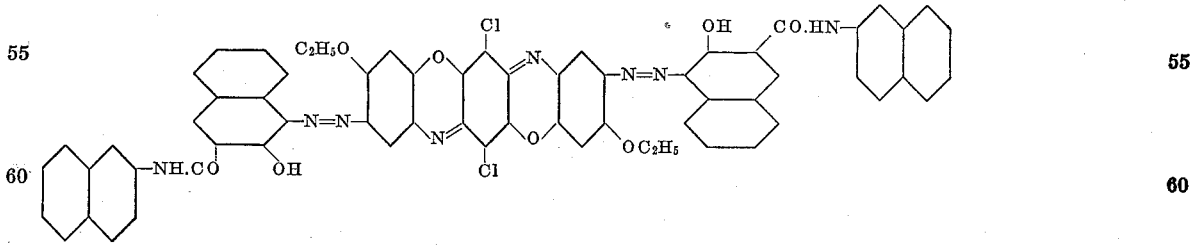

EXAMPLE 4

The grounding of cotton yarn is effected in a solution which contains 3 g. of 2.3-hydroxynaphthoyl-α-naphthylamine per liter. For development there is used a solution (2.5 g. per liter, calculated on the base) prepared by diazotization of 2.7-diamino-9.10-dichloro-triphendioxazine of the formula:

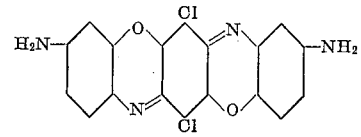

After rinsing and soaping at the boil, there is obtained a navy blue.

On substituting the 2.7-diamino-9.10-dichlorotriphendioxazine by the 2.6-diamino-dichlorotriphendioxazine, there is obtained a bluish-black.

EXAMPLE 5

Cotton is impregnated with a solution which contains per liter 2 g. of 2-hydroxycarbazole-3-carboxylic acid-4'-chloranilide. As developer there is used a tetrazo solution prepared from 2.8-diamino - 9.10 - dichlorotriphendioxazine in the usual manner. After rinsing and soaping there is obtained a violet dark brown.

The dyestuff corresponds to the following formula:

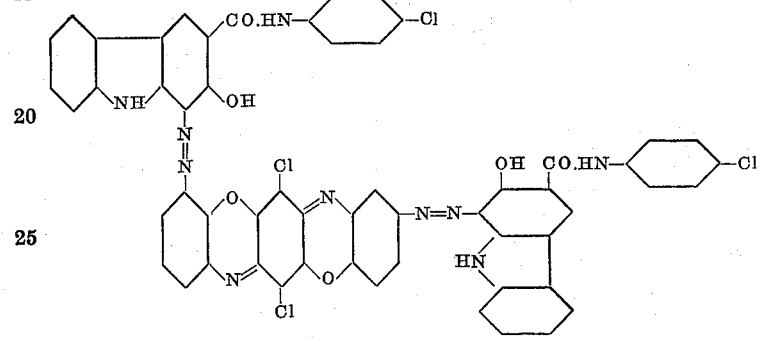

I claim:

1. Water-insoluble azodyestuffs of the general formula:

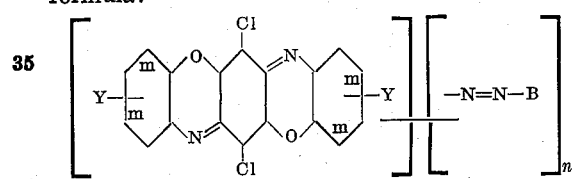

wherein the Y radicals are identical and stand for radicals selected from the group consisting of hydrogen, alkyl and alkoxy, B stands for the radical of an arylamide selected from the group consisting of arylamides of o-hydroxy-naphthoic acid, o-hydroxycarbazole carboxylic acid and acetoacetic acid, and $n$ for one of the numbers 1 to 4, the —N=N—B groups being attached to the m-positions with respect to the azine-nitrogen atoms and the B radicals being identical if $n$ is greater than 1, yielding, when produced on the fiber, in general blue to black shades of good fastness to light.

2. Water-insoluble azodyestuffs of the formula:

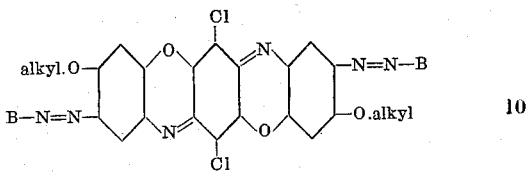

wherein the B radicals are identical and stand for radicals of an arylamide selected from the group consisting of arylamides of o-hydroxy-naphthoic acid, o-hydroxy-carbazole carboxylic acid and acetoacetic acid, yielding, when produced on the fiber, brown to black shades of good fastness to light.

3. The water-insoluble azodyestuff of the probable formula:

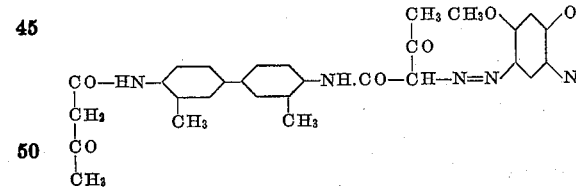
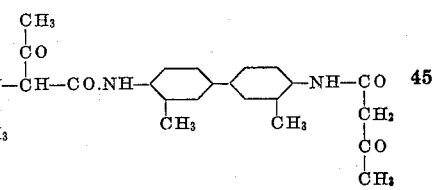

yielding, when produced on the fiber, black shades of good fastness to light.

4. The water-insoluble azodyestuff of the formula:

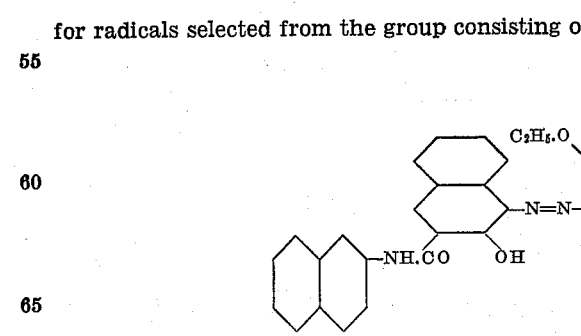
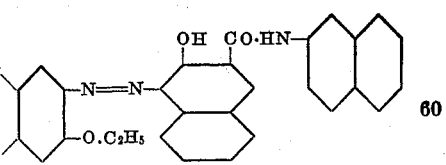

yielding, when produced on the fiber, black shades of good fastness to light.

5. Fibers dyed with a dyestuff as claimed in claim 1.
6. Fibers dyed with a dyestuff as claimed in claim 2.
7. Fibers dyed with a dyestuff as claimed in claim 3.
8. Fibers dyed with a dyestuff as claimed in claim 4.

JOSEF HALLER.